Patented Apr. 19, 1932

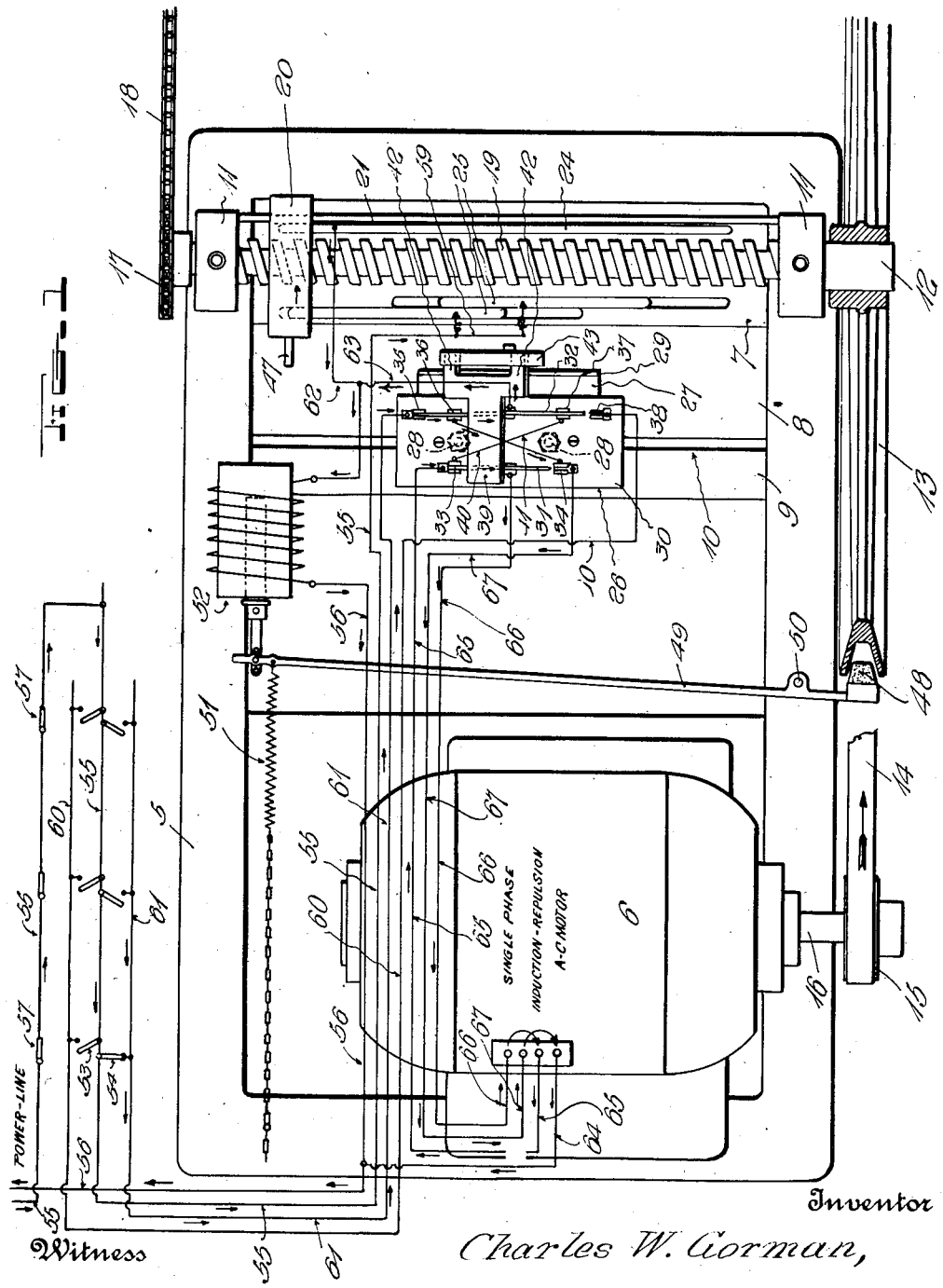

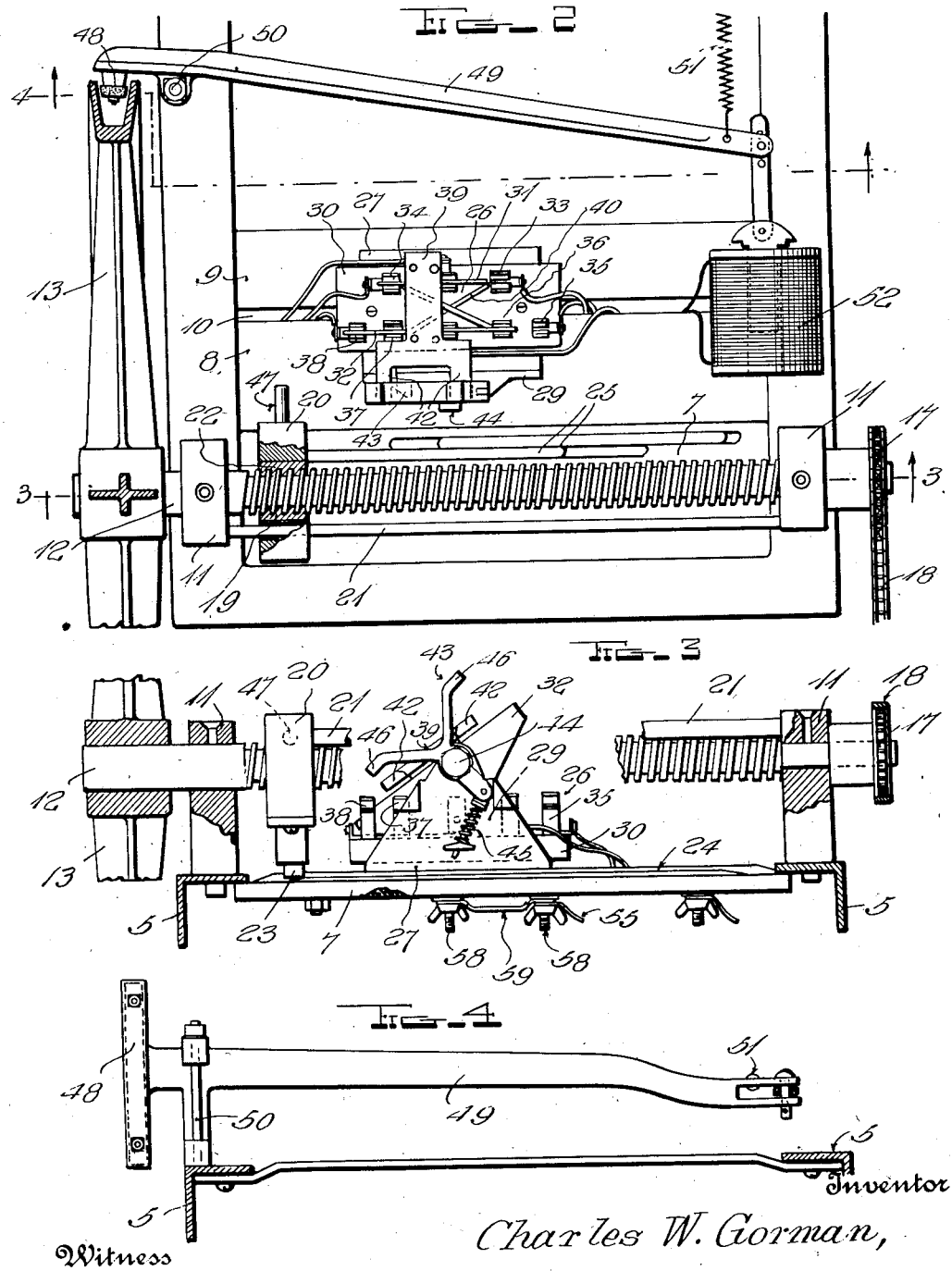

1,854,584

UNITED STATES PATENT OFFICE

CHARLES W. GORMAN, OF MUSKOGEE, OKLAHOMA

DOOR OPERATING MEANS

Application filed April 2, 1928. Serial No. 266,841.

The invention relates to mechanisms driven by electric motors, and in the present disclosure a mechanism is shown capable of being driven first in one direction and then in the other. Such mechanisms have a wide range of use for moving shiftable members alternately in opposite directions, but are particularly adaptable to the opening and closing of doors.

One object of the invention is to provide for the automatic reversing of the motor in case of overload. In a door-operating mechanism, for instance, this is of great advantage, as the door may strike a person, a vehicle, etc., during its closing movement, and such an occurrence would ordinarily cause injury to life or property. With my invention, however, if the door should strike anything of sufficiently stable nature to place an overload on the motor, the latter will automatically reverse and the door will recede from the obstacle with no injury to the latter, the door or the door-operating means. Moreover, in case the door should bind sufficiently to overload the motor, due to a loose hanger, dragging at its lower end, etc., said door will automatically reverse without injury to any parts, at the same time signifying that the door requires attention to allow it to operate freely.

While the above mentioned automatic reversal of the motor is of particular advantage in mechanisms for shifting a door or other load from one position to another, it is not restricted to any particular field of use.

In the mechanism disclosed herein, a normally open motor-starting switch is closed to start the motor in the direction dictated by the position of a reversing switch, and a limit switch then comes into play to maintain the motor circuit for the necessary predetermined period. As soon as the limit switch has moved to circuit-completing position, the starting switch should be opened, leaving control of the motor to the limit switch and hence insuring motor stopping at the proper time. However, in prior mechanisms, the starting switch has often been held closed too long, and trouble has resulted. Hence, it is a further aim of my invention to make novel provision whereby the circuit closed by the starting switch is automatically broken prior to arrival of the limit switch at motor cut-off position, thereby positively taking the motor out of the control of said starting switch.

A self-applied brake comes into play as soon as the limit switch opens the motor circuit, and electrical means are provided initially energized by the starting switch and held energized by said limit switch for releasing said brake when the motor starting switch is closed and for holding it released until the limit switch opens the motor circuit. It is a further object to provide additional automatic switch means whereby the motor and the brake holding means are taken from the control of the starting switch and placed under control of the limit switch, so that the motor and brake holding means cannot continue to function after opening of said limit switch.

A still further aim is to provide an organization of extreme simplicity yet high efficiency which may be readily adapted to various conditions with which such an assemblage must cope.

With the foregoing in view, the invention resides in the novel subject matter hereinafter described and claimed, description being accomplished by reference to the accompanying drawings.

Fig. 1 is a top plan view partly broken away and in horizontal section.

Fig. 2 is a fragmentary top plan view partly in section.

Fig. 3 is a vertical sectional view on line 3—3 of Fig. 2.

Fig. 4 is a similar view on line 4—4 of Fig. 2.

The drawings above briefly described, disclose the preferred form of construction and while this construction will be herein specifically explained, it is to be understood that within the scope of the invention as claimed, numerous variations may be made.

The numeral 5 denotes a base frame upon one end of which, an electric motor 6 is mounted. This motor is of the single phase, induction repulsion, alternating current type. At the other end of the frame 5, an insulating base 7 is secured, and between this base and the motor 6, are two transverse plates 8—9 which are spaced apart to provide a slot 10. At the ends of the insulating base 7, the frame 5 is provided with upstanding bearings 11 in which a work-performing shaft 12 is rotatably mounted, one end of this shaft being provided with a large grooved pulley 13 driven by a belt 14 and a small pulley 15, the latter being secured to the motor shaft 16. The shaft 12 in the present disclosure is provided with a sprocket 17 engaged by a sprocket chain 18 for transmitting power from said shaft, for instance to operate a door.

Shaft 12 is provided with a threaded portion 19 passing through a traveling member such as a block 20, rotation of which is prevented by a rod 21 secured to the bearings 11 and passing slidably through an opening in said block. Preferably, the block 20 is provided with a soft metal lining 22, such as babbitt, threaded to engage the hard metal threads 19 of the shaft 12. Thus, in case of short circuit or other cause, permitting the threaded shaft portion or screw 19 to force the block 20 against one or the other of the bearings 11, the soft metal thread of the lining will merely strip if the screw continues to operate, instead of causing injury to other parts.

The block 20 carries a traveling contact 23 adapted to bridge between one contact track 24 and a parallel contact track formed of relatively adjustable sections 25, both of these tracks being carried by the insulating base 7. When the machine is at rest, the traveling contact 23 is disengaged from at least one of the contact tracks, and in some adjustments of the machine, from both of them. However, after the motor has been initially started, screw 19 causes traveling of the block 20 to bring said traveling contact 23 upon both contact tracks 24—25, and these parts then constitute a limit switch for directing current to the motor for a predetermined time, controlled by adjustment of the track sections 25, according to the distance which it is desired to drive the chain 18.

At one side of the screw 19, a current reversing switch 26 is provided, the construction of which is covered by my co-pending U. S. application, Serial No. 266,842, filed April 2, 1928. This reversing switch embodies a metal base 27 resting upon the plates 8—9 and secured to them by clamping bolts 28 passing through the slot 10, permitting adjustment of the reversing switch 26 longitudinally of the screw 19. Rising rigidly from base 27, is a wall 29 with which certain parts hereinafter described, are associated. Secured upon the base 27, is an insulating base 30 upon which two switch blades 31—32, are pivoted between their ends. Co-operable with the opposite ends of the blade 31, are two contacts 33—34 carried by the base 30. Co-operable with one end of the blade 32, are two contacts 35—36, and co-operable with the other end of said blade 32, are two additional contacts 37—38. The two blades 31—32 are secured to an insulator 39 for movement simultaneously, and when said blades are swung in one direction, they engage the contacts 33—35—36 but disengage from the contacts 34—37—38. Similarly, upon swinging of the blades 31—32 in the other direction, they disengage from the contacts 33—35—36 and engage the contacts 34—37—38. The contacts 33—37 are cross-connected by a conductor 40, and a similar conductor 41 connects the contacts 34—36.

The end of the insulator 39, toward the screw 19, is provided with lugs 42 which project outwardly beyond the wall 29 and are spaced apart longitudinally of said screw. Co-operable with these lugs, is a Y-shaped switch actuator 43 which is pivoted at 44 to the wall 29, the lower end of said actuator being connected with an appropriate spring device 45 which serves to rapidly shift it to its final position in one direction or the other, when said actuator is moved in said direction slightly past a dead center position. The arms 46 of the actuator 43, constitute trips for co-operation with an additional trip 47 on the block 20, for forcing said actuator slightly past the above-named dead center position, when said member 20 moves in one direction or the other. The distance between the trips 46 is very small compared with the travel of the block 20, so that the reversing switch 26 will be thrown from one position to the other while the limit switch 23—24—25 is in circuit-closing position, for a purpose to hereinafter appear. Obviously, due to the construction of the actuating means 42—43—45, etc., said switch will be rapidly thrown from one position to another, with such speed that even though current is at that time being passed through the switch to the motor 6, the speed of the latter will not be affected. Moreover, it may here be explained that although it is unusual to throw a current-reversing switch for a motor to obtain a result other than reversing of the latter as soon as possible, such prompt reversal does not take place in connection with the present invention. The switch 26 is not thrown from one position to another until the motor 6 has attained speed and its brushes have consequently "kicked out" to armature-short-circuiting position. Promptly after the brushes reach this position however, quick throwing of switch 26 from one position to another is effected and will not affect the speed or the direction of rotation of the motor, but this motor is conditioned for reversal. With the motor so conditioned, if an overload should be placed upon it, for instance, by retarding of a door operated thereby in one way or another, the motor speed will decrease and the motor brushes will "kick in" and the motor will immediately reverse, causing reversal of the door or other load being moved. This is of particular advantage in case the door upon closing, should strike anything which might be injured by said door or might injure the latter or its operating means, as whenever such an occurrence takes place, the door is immediately backed away from the obstacle with which it has come in contact.

A brake shoe 48 is provided for the pulley 13, said shoe being secured to one end of a lever 49 which is fulcrumed near said end to the frame 5, as indicated at 50. Connected to the other end of lever 49 is an appropriate spring device 51 which is anchored to the base 5, said spring device exerting a constant force to swing the lever 49 in brake-applying direction. A solenoid 52 however, is connected to the lever 49 for moving it to brake-releasing position when the motor 6 is to be started, and for holding it in such position until the motor is cut off.

Motor-starting switches 53—54 are provided for initially directing current through the solenoid 52, the reversing switch 26 and the motor 6, to start the latter, switch 53 being operable to effect motor rotation in one direction, for instance, to open a door, and switch 54 being used to effect reverse rotation of the motor to close the door. When switch 53 or 54 is closed, the current in traveling to the motor 6, passes through either the contact 35 and one end of the switch blade 32 or through the contact 38 and the other end of said switch blade, and necessarily the starting switch is held closed until the limit switch 23—24—25, is in circuit-completing position. Then, the starting switch should be released to permit it to open, but even if said starting switch be held closed longer than the period for which the machine is to operate in one direction, no injurious results will happen. This is due to the fact that as soon as trip 47 of the block 20, effects reversal of the switch 26, the starting circuit which was completed by the starting switch 53 or 54, is automatically broken at the contact 35 or 38, as the case may be. Hence, even though a person operating the mechanism, does not know that the starting switch should be released immediately after initially starting the motor, and should hold it closed for a longer period, the automatic breaking of the starting circuit at the contact 35 or 37, insures that the motor 6 shall be placed under the control of the limit switch and taken out of control of the starting switch, insuring that said motor shall stop at the proper time.

Breaking of the starting circuit at the contact 35 or 38 does not break the circuit of the solenoid 52 through which said starting circuit has directed current to release the brake shoe 48, as by the time the starting circuit is broken, the limit switch 23—24—25 has come into play and this limit switch continues to direct current through said solenoid, holding the brake shoe in released position. Hence, as soon as the limit switch effects opening of the motor circuit, it also de-energizes the solenoid 52, with the result that the spring device 51 immediately effects brake application and stops the machine.

The wiring used, is such as to produce the following functions and it may be varied as desired. The starting switch 53 or 54 must direct current through the solenoid 52 and through the reversing switch 26, including contact 35 or 38, to effect initial starting of the motor, and obviously this motor will turn in the direction dictated by the position of said reversing switch. The limit switch 23—24—25 must take up the task of directing current to the motor 6, through the solenoid 52 and through the reversing switch 26, including the contact 35 or 38, immediately after motor starting. Throwing of switch 26 from one position to the other, must break the starting circuit without affecting the circuit through which current is then fed to the motor, and opening of the limit switch when member 20 reaches the limit of its predetermined travel, must not only effect opening of the motor circuit, but opening of the circuit of the solenoid 52. As one way of accomplishing these results, I have shown certain wiring which will now be described.

55 and 56 denote two wires leading from a source of current, wire 55 being provided with one or more switches 57 to be opened in case of emergency, to discontinue the supply of current to the entire machine. This wire 55 is electrically connected with the contact track sections 25, by one of two clamping bolts 58 which secure said sections in adjusted position, these bolts being connected by a conductor 59. Wire 56 leads from the solenoid 52. Two wires 60—61 are provided to receive current from the wire 55, through switch 53 or 54 respectively. Wire 60 is connected to contact 38 and wire 61 leads to contact 35. From the contact track 24, a wire 62 leads to the solenoid 52, and a wire 63 extends from wire 62 to the blade 32. Four wires 64—65—66—67 are connected to motor 6. Wire 65 is connected to contact 33; wire 66 is connected to the switch blade 31; and wire 67 connects with the contact 34.

After the limit switch 23—24—25 has closed the circuit of the motor 6 of the solenoid 52, with the reversing switch 26 in the position shown in Fig. 1, the current travels as indicated by the arrows in this view, as long as switch 54 is closed or blade 32 is in engagement with contact 35. If switch 54 be opened, the current is then directed through the reversing switch to the motor 6, solely by the limit switch 23—24—25. As soon as member 20 moves sufficiently to cause its trip 47 to swing the actuator 43 slightly past dead center position, the reversing switch 26 is rapidly thrown to its reverse position, disengaging the contact 35 and breaking the starting circuit, if it has not been previously broken by opening of switch 54. This throwing of the reversing switch 26 reverses the direction of travel of the current to one of the windings of the motor 6, but as the brushes of the latter are then in armature-short-circuiting position, its direction of rotation is not affected. However, if any circumstances should now arise, placing an overload on the motor and consequently decreasing its speed, the brushes move in the usual way to armature-energizing position, and the motor immediatey reverses with the advantages above pointed out. After throwing the limit switch 26, the machine continues to operate until the traveling contact 23 of the limit switch breaks the circuit between the contact tracks 24—25, by moving off of one or both of these tracks, as the case may be. With the current thus broken for the motor 6, the current for the solenoid 52 is also broken, with the result that spring 51 immediately moves lever 49 to apply the brake shoe 48, thus bringing the machine smoothly to a standstill. The machine is now out of control of the switch 54 but if switch 53 be closed, the solenoid 52 is energized and current directed to the motor 6, but due to the position which the reversing switch 26 then occupies, this motor will rotate in the reverse direction. This rotation of course causes similar rotation of the shaft 12 and causes block 20 to move in the opposite direction from that in which it previously moved. During its travel, this block effects throwing of the reversing switch 26 without affecting the rotation of the motor 6 and when said block reaches a point at which the limit switch 23—24—25 opens the motor and solenoid circuits, the machine comes to rest.

When the invention is used for operating a door, I so adjust the reversing switch 26 as to cause throwing thereof immediately after the door starts on its closing movement. Hence, in case it should strike an automobile, a person, etc., the motor will immediately reverse and the door moved again to open position. The adjustability of this switch and the adjustability of the limit switch track 25—25, permits adaptation of the machine to doors and the like having different degrees of travel.

Not only is the invention rather simple and inexpensive, but in actual practice it has proven to be highly efficient. If the operator fails to release the starting switch, no harm will result as the starting circuit is broken at the contact 35 or 38 and hence the motor is placed under the control of the limit switch. The starting switch in addition to effecting starting of the motor, initially energizes the solenoid 52 to release the brake 49, and as soon as the limit switch takes up the work of directing current to the motor, it also maintains the circuit to the solenoid to hold the brake released. As soon as the limit switch breaks the motor circuit, it also breaks the solenoid circuit to effect immediate application of the brake. During each travel of the member 20 in one direction or the other, the switch 26 is thrown to condition the motor 6 for reversing, as above described, adding a great element of safety. The switch or switches 57 may obviously be opened in case of emergency to break the current to the entire machine, adding another element of safety. In case short circuit or other cause should permit continued driving of the machine and consequent jamming of the block 20 against one of the bearings 11, the threads of the soft metal lining 22 will merely strip instead of injuring any other parts.

While in practice, I have used the machine primarily as a door operator, it will be obvious to those skilled in the art that said machine as a whole and certain groups of related elements thereof, are not restricted to this or in fact to any particular field of use. Hence, considerable latitude is allowed within the scope of the invention as claimed.

I claim:—

1. In combination with a single phase, repulsion-induction, electrically reversed motor; means driven by said said motor and connected therewith for automatically reversing the current travel to one winding of said motor promptly after the brushes thereof reach armature-short-circuiting position and for then immediately directing the reversed current continuously to said winding, thereby conditioning the motor for automatic reversing in case overload should cause motor speed reduction and consequent return of the brushes to armature-energizing position.

2. In combination with a single phase, repulsion-induction, electrically reversed motor; a quick-acting reversing switch for said motor connected with the latter for reversing the current flow to one winding thereof and for then immediately directing the reversed current continuously to said winding, said switch being provided with a pair of spaced actuating trips, a traveling member synchronized with and reversible with said motor, and a trip on said traveling member for engagement with either of said actuating trips to automatically throw said reversing switch from one position to the other promptly after the motor brushes reach armature-short-circuiting position.

3. In combination, a single phase, repulsion-induction, electrically reversed motor, a starting switch for the motor, a limit switch synchronized with the motor for directing current to said motor after starting thereof in either direction; a quick-acting reversing switch in circuit with said motor, said starting switch and said limit switch and connected in its circuit to reverse the current travel to one winding of the motor and to then immediately direct the reversed current continuously to said one winding; and means for automatically throwing said reversing switch from one position to the other promptly after the motor brushes reach armature-short-circuiting position.

4. In combination with a single phase, repulsion-induction, electrically reversed motor; a traveling member synchronized with and reversible with said motor, a starting switch for said motor; a limit switch for directing current to said motor after starting thereof in either direction, said limit switch embodying a traveling circuit making and breaking contact on said traveling member; a quick-acting reversing switch in circuit with said motor, said starting switch and said limit switch and connected in its circuit to reverse the current travel to one winding of the motor and to then immediately direct the reversed current continuously to said one winding; said reversing switch having a pair of actuating trips spaced apart along the path of said traveling member a distance considerably less than the travel of said traveling contact, and a trip on said traveling member co-operable with either of said pair of trips to throw said reversing switch from one position to the other promptly after the motor brushes reach armature-short-circuiting position.

5. In combination, a single phase, repulsion-induction, electrically reversed motor, a shaft driven by said motor and adapted for effecting movement of a movable object in one direction or the other, said shaft having a threaded portion, a traveling member actuated by said threaded shaft portion, a starting switch for said motor, a limit switch for directing current to the motor after starting thereof in either direction, said limit switch embodying a traveling circuit making and breaking contact on said traveling member; a quick-acting reversing switch in circuit with said motor, said starting switch and said limit switch and connected in its circuit to reverse the current travel to one winding of the motor and to then immediately direct the reversed current continuously to said one winding; said reversing switch having a pair of actuating trips spaced apart along said threaded shaft portion a distance considerably less than the travel of said traveling contact, and a trip on said traveling member co-operable with either of said pair of trips to throw said reversing switch from one position to the other promptly after the motor brushes reach armature-short-circuiting position.

6. In combination with an electric motor; a traveling member synchronized with and reversible with said motor, a starting circuit for said motor embodying a normally open starting switch and normally closed switch means; a limit switch for directing current to said motor after starting thereof in either direction; quick-acting switch means for reversing travel of current to one winding of said motor, a pair of trips spaced apart along the path of said traveling member and operatively connected with both said normally closed switch means and said reversing switch means, and a trip on said traveling member co-operable with either of said pair of trips to simultaneously effect opening of said normally closed switch means and shifting of said reversing switch means when said traveling member has moved a predetermined amount.

7. In combination, a single phase, repulsion-induction electrically reversed motor, a screw driven by said motor, a traveling member actuated by said screw, parallel stationary contact tracks parallel with said screw, a traveling contact on said traveling member adapted to bridge between said tracks to provide a limit switch for the motor, a current reversing switch stationarily mounted near said screw and having a switch member movable from one position to another to reverse travel of current to one winding of the motor, stationary contacts co-operable with said movable switch member to form one closed switch when said switch member is in one position, and another closed switch when said switch member is in its other position, starting switch means and wiring for directing current to the motor through said reversing switch and one or the other of said stationary contacts according to the position of said movable switch member, wiring whereby said contact tracks and said traveling contact direct current to the motor through the reversing switch after starting of said motor, and quick-acting means for rapidly shifting said movable switch member from one position to the other to simultaneously reverse travel of current to the motor and break the circuit closed by the starting switch, said quick-acting means being active upon movement thereof past a dead center position, said quick-acting means and said traveling member having trips for moving said quick-acting means past said dead center position while said traveling contact remains on said contact tracks.

8. A structure as specified in claim 7; together with means for adjusting said quick-acting means longitudinally of the screw to vary the time at which it is moved by said traveling member.

9. A method for conditioning a single-phase, repulsion-induction, electrically-reversed motor for automatic reversing in case of overload, consisting in rapidly reversing the current flow for one winding of said motor promptly after the usual motor brushes reach armature-short-circuiting position and continuously directing current to said one winding, whereby overload and consequent return of the brushes to armature-energizing position will cause the motor to reverse.

In testimony whereof I have hereunto affixed my signature.

CHARLES W. GORMAN.